UNITED STATES PATENT OFFICE.

CONRAD GRAF, OF BANNING, CALIFORNIA.

PRESERVING FRUIT-JUICES.

SPECIFICATION forming part of Letters Patent No. 608,425, dated August 2, 1898.

Application filed December 29, 1896. Serial No. 617,384. (No specimens.)

*To all whom it may concern:*

Be it known that I, CONRAD GRAF, a citizen of the United States, residing at Banning, in the county of Riverside and State of California, have invented certain new and useful Improvements in Processes of Preserving Fruit-Juices; and I do declare the following to be a full, clear, and exact description of the invention, such as will enable others skilled in the art to which it appertains to make and use the same.

Heretofore it has been impossible to preserve fruit-juices for any length of time without fermentation or the addition of a chemical to counteract the process of fermentation. The object of my invention is to preserve the juice of grapes, pears, apples, and the like for an indefinite period of time; and to this end the invention consists in the process of preserving fruit-juices hereinafter more fully described, and particularly pointed out in the claim.

To carry my invention into effect, I select such fruit or berries as are perfectly sound and well ripened and as soon after they are picked as possible. The juice is then very carefully expressed from the fruit, and is first passed through a block-tin coil surrounded by water maintained at a temperature of about 145° Fahrenheit, so as to raise the temperature of the juice to that of the surrounding water, and thereby prevent fermentation and at the same time insure sterilization. I next convey the heated juice, without exposure to the atmosphere, into a suitable non-metallic tank, from which the air has been exhausted, when it is allowed to cool and settle for three or four days. In practice I prefer to fill the tank with the juice and then seal it air-tight. I next pass the juice through a filter *in vacuo* to remove the sediment and at the same time prevent the access of air, and then draw it off into bottles, leaving a space of about two inches between the level of the liquid and the cork. The bottles containing the juice are then returned to the hot-water tank and allowed to remain until the temperature of the juice is raised to that of the surrounding water—viz., 145° Fahrenheit—to insure a final sterilization. The bottles are then removed from the hot-water tank, the corks are sealed, and the bottles stored away for use.

The resulting liquid is a non-fermented non-alcoholic beverage and is preëminently fitted for medicinal use.

I am aware that fruit-juices may be preserved by boiling them; but it is a well-known fact that grape-juice when boiled loses its flavor, and therefore I do not claim such treatment, my process being confined to heating the juice to a temperature of between 145° and 160°, so as to insure the destruction of microbe life and preserve the juice without affecting its flavor.

Having thus fully described my invention, what I claim as new and useful, and desire to secure by Letters Patent of the United States, is—

The improved process of preserving fruit-juices which consists in subjecting the juice to a temperature of 145° Fahrenheit, to prevent fermentation and promote sterilization, cooling and filtering the same *in vacuo*, to remove the sediment and prevent access of air, then subjecting the same to a temperature as above to insure final sterilization and hermetically sealing the same, substantially as and for the purpose set forth.

In testimony whereof I hereunto affix my signature in presence of two witnesses.

CONRAD GRAF.

Witnesses:
W. G. HATHAWAY,
E. S. TRIPP.